United States Patent [19]

Sherwin

[11] 4,024,532

[45] May 17, 1977

[54] CHARACTER MODULE FOR AUTOMATIC SIGN

[76] Inventor: Richard N. Sherwin, Rockford Bay, Coeur d'Alene, Idaho 83814

[22] Filed: Feb. 5, 1973

[21] Appl. No.: 329,405

[52] U.S. Cl. ................................ 340/336; 340/381; 340/378 R; 40/28 C

[51] Int. Cl.$^2$ .................. G09B 13/00; H05B 39/00; H05B 41/00

[58] Field of Search ............... 340/366 R, 373, 376, 340/381, 336; 40/28 C, 52 R; 335/17

[56] References Cited

UNITED STATES PATENTS

| | | | |
|---|---|---|---|
| 3,096,594 | 7/1963 | Skrobisch | 40/28 C |
| 3,273,270 | 9/1966 | Skrobisch | 40/52 R |
| 3,368,216 | 2/1968 | Rose | 340/373 |
| 3,469,258 | 9/1969 | Winrow | 340/373 |
| 3,614,773 | 10/1971 | Gordon | 40/28 C X |
| 3,725,910 | 4/1973 | McNaney | 340/366 R X |

*Primary Examiner*—John W. Caldwell
*Assistant Examiner*—William M. Wannisky

[57] ABSTRACT

A reflective type module for remotely controlled sign displays providing a plurality of linear elements adapted for form the Latin alphabet and Arabic numerals, each element controlled by a two position electromechanical motor to be rotatably moved to a visual or non-visual state in response to an electrical signal. Each module is self-contained and individually encased.

4 Claims, 5 Drawing Figures

CHARACTER MODULE FOR AUTOMATIC SIGN

BACKGROUND OF THE INVENTION

1. Related Applications

There are no applications related hereto now filed in this or any foreign country.

2. Field of Invention

This invention relates generally to remotely controlled sign displays and more particularly to a character module and associated operative mechanism therefore.

3. Description of Prior Art

Remotely controlled, automated signboards, particularly in their illuminated form, have been known for some time to display various visually imagery and with the advent of economical computer logic circuitry such signboards have become quite sophisticated in the displays which they present. This field of art for one reason or another has not effectively been extended into the area of highway informational signs. The instant invention seeks to make such an extension by providing a character module suitable for such purpose.

Display modules for remotely controlled signs may be grouped broadly into a first class comprising self-illuminated characters and a second class comprising character modules formed of reflective elements. The first class undoubtedly is better known and more extensively developed but is distinguished, quite essentially, from the second class not only in the matter of display but also in the essential nature of control circuitry necessary to accomplish the display. The instant invention provides a member in the second class of such devices.

A character module of the first class to be effective must, of necessity, have a darkened surrounding environ and this generally limits the effective use of such devices to places to times of general darkness. A highway sign ordinarily must be operative in both daylight and darkness and therefore rather essentially requires a reflective type module since this type of sign may be visual by reason of coloration during daylight and may be externally lighted during hours of darkness for visual display either by the lights of oncoming vehicles or some other ancillary sources. It also has been found that even in hours of darkness the self-illuminated character module is not nearly so legible as a relfective type module of similar geometry.

Various reflective character modules have heretofore become known though not so well known as the self-illuminated type. In general the prior art devices have been so complex as to make them costly and generally unreliable both as to maintenance and durability.

The instant invention is distinguished from the known reflective devices providing a very simple mechanical motion to change module elements from reflective to non-reflective states by simple half-circular rotation. The rotation is accomplished by two position motors for simplicity, accuracy and durability. The whole module is unitized in a sealed casement to lessen maintenance and aid longevity. The module is so designed as to provide appropriate element illumination either from auxiliarly sources or oncoming auto lights in times of darkness and it may be readily seen by daylight reflected from contrasting colors of elements and background during other times. The module is extremely dependable and maintenance free and its operation is almost completely reliable.

SUMMARY OF INVENTION

My invention provides a box-like casement, with removably sealable transparent faceplate, carrying my character module at spaced distance inwardly adjacent the face.

The module geometry is of the known standarized type providing a peripheral square with vertical-horizontal cross and diagonal cross, all formed of individual linear elements terminating at each junction point, thus making 16 lineal elements. Each element is pivotally journaled at its end points and each is irrotatably connected to a two position electro-mechanical motor at one of its end parts to pivot the module so as to present either the face or the obverse of the element facing forwardly beneath the faceplate. The plural electric motors are adapted to reversal with current change. The face of each of the character module elements is covered with a known light reflective material and colored to contrast with the background; the obverse of each element is colored contrastingly, generally black, as is the interior of the module so that the face is readily visible in the daylight or on presentment of reflected light.

The electric motors are controlled by a separate logical circuitry of known nature.

In providing such a device it is:

A principal object of my invention to provide a character module composed of flat lineal elements that are individually controlled and activated by half-circular rotation.

A further object of my invention is to provide such a module that may be sealably encapsulated to lessen physical deterioration.

A further object of my invention to provide a device of the nature aforesaid that is of new and novel design, of rugged and durable nature, of simple and economic manufacture and otherwise well adapted to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as required.

BRIEF DESCRIPTION OF DRAWINGS

In the accompanying drawings wherein like numbers of reference refer to similar parts throughout.

DESCRIPTION OF THE PREFERRED EMBODIMENT

Figure 1:
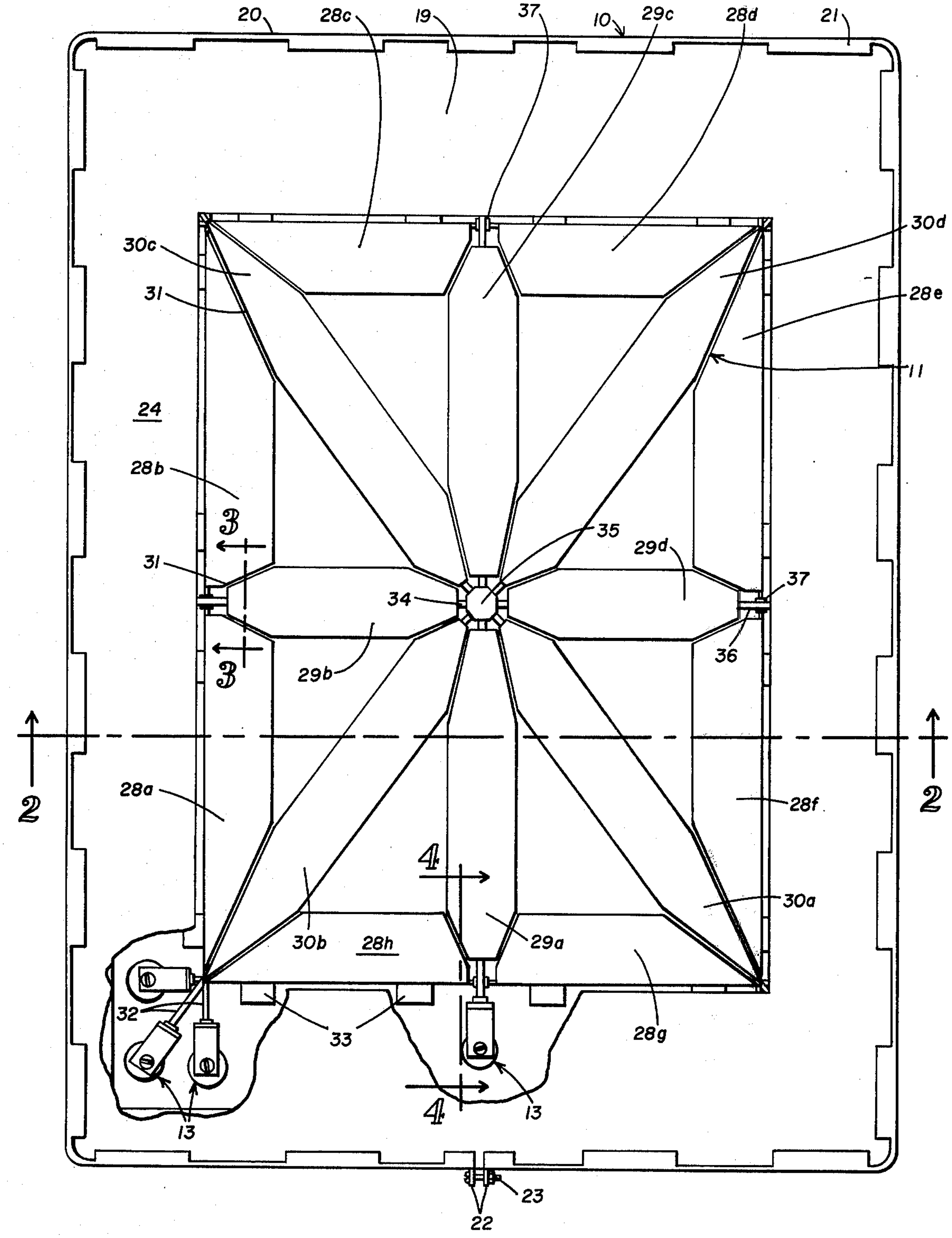
FIG. 1 is a partially cut-away orthographic surface view of the face of my invention showing its various parts, their configuration and relationship.
Figure 2:
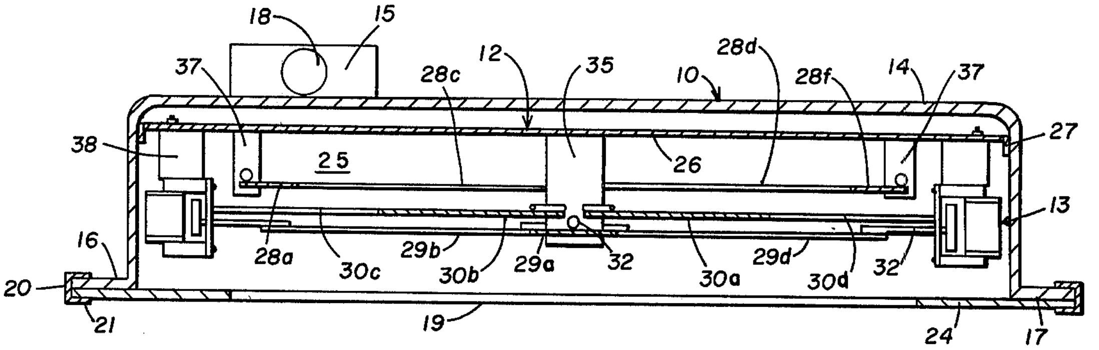
FIG. 2 is an orthographic cross-sectional view of the invention of FIG. 1 taken on the line 2—2 thereon in the direction indicated by the arrows to show further details of the module construction.

Referring now to the drawings in more detail and particularly to that of FIG. 1, it will there be seen that my invention generally comprises casement 10 internally carrying mounting element 12 to support charactted module 11 and associated activating means 13.

Casement 10 provides five sided rectilinear casement box 14 of some depth with connector protuberance 15 in the rearward part thereof. The forward edge of the box terminates in annular outwardly flaring flange 16 presenting a planar forward-facing surface 17 of some aerial extent to sealably receive a faceplate. Preferably the casement is formed as a unitary structure defining only hole 18 in connector protuberance 15 to allow exit of electrical control connectors therefrom.

Face cover 19 is a flat sheet-like element of configuration to define a periphery co-extensive with the outer periphery of flange 16 so that when the two elements are placed in adjacency the two peripherys coincide. The face cover is formed of some material of sufficient optical transparence to allow light to pass freely in either direction so that the character module may be readily viewed therethrough. It is often desirable to provide some known type of non-reflective surface or coating for the face cover to prevent unwanted external reflections. Flexible band-like connector 20 extends about the co-extensive peripheries of flange 16 and face 19 with spaced fasteners 21 extending thereover on each side thereof. The adjacent ends of connector 20 are provided with fastening brackets 22 releasably and adjustably joined to each other by nut-bolt combination 23 extending therebetween to allow a releasable fastening of the face cover to casement flange 16. Preferably some sealant (not shown) is placed between the adjacent surfaces of the flange and the face cover to well seal the joint.

The face plate will normally be opaqued with paint or otherwise about its peripheral annulus 24 outside the periphery of the character module.

Planar mounting element 12 is supported in the medial part of chamber 25 defined within casement 10. The mounting element provides planar mounting surface 26 having upturned peripheral rim 27 of a configuration similar to an internal cross-section of chamber 25 so that the mounting element may be attached to the casement by this rim. Mounting surface 26 is positioned medially in chamber 25 at a spaced distance from both the back and face to allow module operation forwardly thereof and simple access for parts joinder rearwardly. The forward facing surface of the mounting element provides character module background and is therefore in some color that contrasts with the forward facing reflective surfaces of the character module. In most highway sign usage the desired background color is normally a black or intense green to provide maximum contrast with the preferred white reflective surface of the character module elements.

Character module 11 is of a configuration heretofore known providing 16 separate individual elements with eight arranged as the periphery of a square **28*a* through 28*h*, four as a vertical cross 29*a* through 29*d* and four as a diagonal cross 30*a* through 30*d* all superimposed as illustrated in FIG. 1. Each element extends only to a joinder with any other element, and the ends of all are appropriately truncated 31** so that any adjacent elements might pivot with respect to any other without interference. Modules of this essential nature have been found sufficient to reproduce any letters of the Latin alphabet and any number of the Arabic system, and other cognizable symbols.

The forward facing or definitive surface of each module element is colored contrastingly to the background color and provided with some highly reflective surface for nighttime use. The color of preference in modern highway signology is white and the coating is of tiny glass beads, though obviously these materials are only matters of choice and may be replaced with other materials having similar characteristics.

Each module element 28, 29, 30 is provided with a structurally carried mounting rod 32, the medial elements having the rods medially positioned and the peripheral elements having the rods positioned on the outward sides with outwardly extending counterweights 33 so that each element is balanced with its center of mass substantially at the mounting axis. End 34 of each internal module element is journaled in central bearing 35 supported on mounting element 12 and extending forwardly therefrom. End 36 of each peripheral element is carried in one of the four peripheral bearings 37 again mounted upon mounting element 12 and extending forwardly therefrom. The distance of mounting each module element forwardly of mounting element 12 must vary in some instances of adjacent elements so that there may be clearance between the various crossing mounting rods 32. The mounting bearings per se are preferably bushing type holes of appropriate configuration formed in self-lubricating material such as the silicone plastics. Ordinary bearings obviously may be used but they increase cost considerably.

Activating means 13 comprise two position electric motors irrotatably associated with each mounting rod at its non-bearing end. The motors are mounted forwardly of spacing blocks 38 on mounting element 12 by nut-bolt combinations 39. Again, the mounting must be such that there is no interference between crossing mounting rods 32 of adjacent elements and preferably should be such that the planes of each character module element are substantially parallel to each other for clarity of viewing. Variance in dimension of spacing blocks 38 readily allows accomplishment of this requirement.

Figure 3:
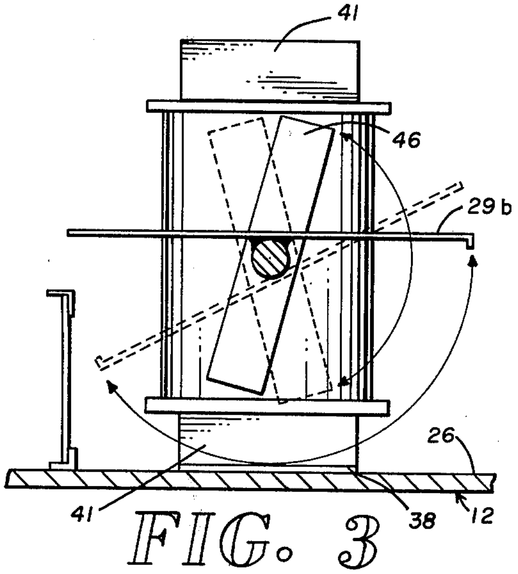
FIG. 3 is a somewhat enlarged, idealized view looking inwardly from a module element toward the controlling motor, taken on a line such as 3—3 on FIG. 1 in the direction indicated by the arrows, but with some adjacent structures and the mounting element removed for clarity.
Figure 4:
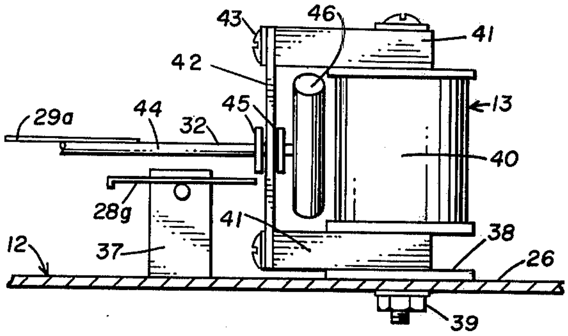
FIG. 4 is a somewhat enlarged partial vertical cross-sectional view taken on the line 4—4 of FIG. 1 in the direction indicated by the arrows to show the sideview of one of the motors of my invention to further delineate its details.
Figure 5:
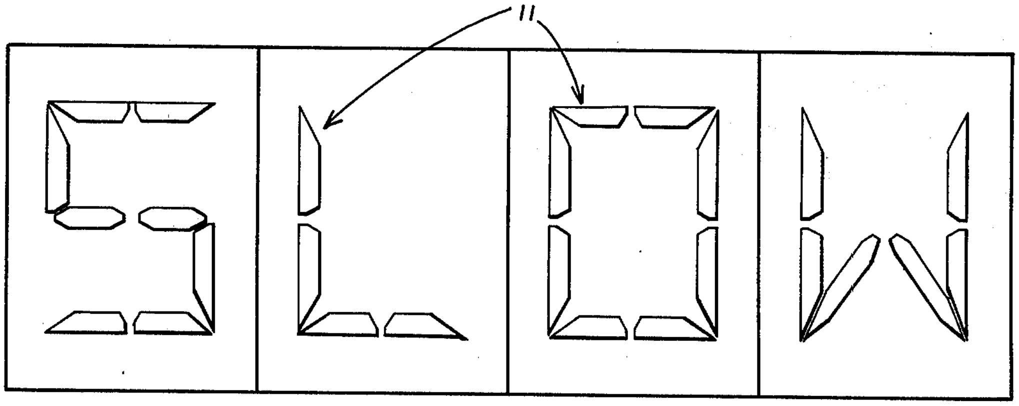
FIG. 5 is a combined four element module indicating the manner in which the module may be programmed to form words by combining letters of the Latin alphabet.

Motors 13 are best seen in detail in FIGS. 3 and 4. Each motor provides electro-magnetic coil 40 having paired, opposed pole pieces 41 extending toward the mounted module element. Non-magnetic bearing piece 42 extends between the outwardly extending ends of pole pieces 41 and is removably fastened by studs 43 extending therethrough and threadedly engaged in the pole pieces. The activated end 44 of each mounting rod 32 is provided with paired cooperating spaced thrust washers 45 to maintain proper alignment of the element relative bearing piece 42. The end part of each mounting rod irrotatably carries magnet 46 of a length such as to allow rotation between adjacent pole pieces 41. Magnets 46 offset about 15° toward the direction of rotation from perpendicular to the plane of the module element so that the device may be readily activated.

If desired, the module elements may be biased to a position substantially parallel to the faceplate by spring means (not shown) or other similar known mechanisms, and with this arrangement the motors may be either single or double-acting as desired. Again, if desired, a mechanical stop might be added under the non-rotating side of the module element to prevent its rotation past its horizontal position if desired. Any of these modifications might be desirable in species of my invention, but none are required for it to function.

Preferably, for use on highway signs a small electrical heater may be added in casement chamber 25 to prevent formation of condensation and frost. Normally not much heat is required for this purpose and heaters of 10 to 15 watts are sufficient in modules of eighteen by 24 inches in dimension.

Having thusly described my invention its operation may now be understood:

A module is formed according to the specification and appropriate control circuitry (not shown) provided to furnish appropriate current to activate the several electrical motors of the module according to pre-determined program.

With the module elements in any position, a positive low voltage current may be supplied to any motors to rotate the pre-determined module element controlled thereby to an operative position with reflective surfaces parallel or substantially parallel to the faceplate and facing that plate; or if elements be in this position before application of the current, the position will be maintained. All other modules not desired to be activated are furnished a negative current pulse which either maintains them with their non-reflective side facing outwardly or moves them to this position. The module then presents the pre-determined pattern imposed by this circuitry. Quite obviously any pre-determined pattern may be composed from substantial distance and a plurality of the elements may be joined to create associated symbols that may thus form words or phrases, all as well known in the automobile sign arts.

It is to be noted, as illustrated particularly in FIG. 3, that the module elements will not turn exactly 180° but will constantly have a slight angular offset in the direction in which they are to rotate so that they will positively rotate to a substantially reverse position when the electro-magnetic coil of each motor activates to create a field about the permanent magnet associated therewith. If the permanent magnets were exactly perpendicular between the electro-magnetic poles, it is possible no movement would occur.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and what I claim is:

1. An automatic sign character module, comprising, in combination:

a rectilinear casement having a transparent face and defining a rectilinear chamber;

character module mounted in the chamber, having 16 elongate flat module elements arrayed with eight elements forming the periphery of a square, four elements forming a superimposed vertical cross and four elements forming a diagonal cross, with no element extending beyond the joinder with an adjacent element, each element having truncated ends to allow rotation relative to adjacent elements without interference and each element having a contrasting colored reflective face with a background colored obverse;

each element carried by an elongate mounting rod extending beyond the character elements, the ends of the mounting rods being journaled in spaced planes so as to allow pivotability of associated elements; and independently controllable means associated with each element to pivot the element to present the face or obverse side facing the casement face, comprising a plurality of bi-directional electric motors having a coil reversable by electric charge with paired opposed outwardly extending pole pieces, and;

a permanent magnet, movable in the field between the two extended pole pieces carried by one end part of each mounting rod, to pivot that rod in response to charged coil polarity.

2. An automatic sign character module comprising, in combination:

a substantially rectilinear casement defining a rectilinear chamber with an annual, perpendicularly extending fastening flange about the forward surface thereof;

a flat transparent face of configuration with a periphery co-extensive with the outer periphery of the fastening flange;

releasable means for sealably fastening the face plate to the casement;

a flat planar fastening plate medially carried in the casement channel at a spaced distance rearwardly of the faceplate;

a character module supported upon the fastening plate providing 16 flat, elongate module elements formed as a periphery of a square with superimposed vertical cross and diagonal cross with no element extending beyond joinder with an adjacent element and each element having truncated ends to allow pivotable motion relative to an adjacent element without interference;

each element having a face side with a reflective coating of coloration contrasting to the background and an obverse with background coloration; and each element carried on an elongate mounting rod extending beyond the ends thereof for pivotable mounting in bearings supported upon the mounting plate, the several elements being mounted substantially parallel to each other with adjacent crossings mounted rods in separate planes to prevent interference of the mounting rods; and means associated with each element for pivoting the element to pivot the reflective face or obverse side outward.

3. The invention of claim 2 wherein the means of pivoting elements comprises:

an elongate bar magnet irrotatably carried at one end of each element mounting rod;

a coil type electro-magnet having paired opposed pole pieces extending outwardly therefrom over and about the elongate permanent magnet; and means of supplying current to the electro-magnet to change its polarity to cause rotation of the module element.

4. The invention of claim 3 further characterized by the permanent magnet being mounted with its axis angled toward the direction of rotation of the sign element to slightly more than perpendicular to the flat face so that the normal resting position of the magnet will not be perpendicular to the electro-magnetic pole pieces, to insure positive pivot upon activation.

* * * * *